(12) United States Patent
Steeber et al.

(10) Patent No.: US 11,718,487 B2
(45) Date of Patent: Aug. 8, 2023

(54) BUFFER CONVEYOR

(71) Applicant: SPECIALTY CONVEYOR B.V., Zwaag (NL)

(72) Inventors: Dorian Franklin Steeber, Fort Gibson, OK (US); Emiel Martijn Schouten, Amsterdam (NL); Wouter Balk, Baambrugge (NL)

(73) Assignee: SPECIALTY CONVEYOR B. V., Zwaag (NL)

( * ) Notice: Subject to any disclaimer, the term of this patent is extended or adjusted under 35 U.S.C. 154(b) by 0 days.

(21) Appl. No.: 17/760,682

(22) PCT Filed: Sep. 15, 2020

(86) PCT No.: PCT/EP2020/075703
§ 371 (c)(1),
(2) Date: Mar. 15, 2022

(87) PCT Pub. No.: WO2021/052930
PCT Pub. Date: Mar. 25, 2021

(65) Prior Publication Data
US 2022/0371832 A1 Nov. 24, 2022

Related U.S. Application Data

(60) Provisional application No. 62/902,014, filed on Sep. 18, 2019.

(30) Foreign Application Priority Data

Sep. 25, 2019 (EP) .................................... 19199494

(51) Int. Cl.
*B65G 47/51* (2006.01)

(52) U.S. Cl.
CPC ..... *B65G 47/5131* (2013.01); *B65G 47/5122* (2013.01)

(58) Field of Classification Search
CPC ........................ B65G 47/5131; B65G 47/5122
(Continued)

(56) References Cited

U.S. PATENT DOCUMENTS 4,513,858 A * 4/1985 Fellner .................. B65G 1/133
198/836.1
4,549,647 A 10/1985 Cossé
(Continued)

FOREIGN PATENT DOCUMENTS

EP 0738478 A2 10/1996
EP 2039626 A1 3/2009
(Continued)

OTHER PUBLICATIONS

International Search Report and Written Opinion for corresponding International Application No. PCT/EP2020/075703 dated Feb. 5, 2021.

*Primary Examiner* — James R Bidwell
(74) *Attorney, Agent, or Firm* — Steven M. Koehler; Westman, Champlin & Koehler. P.A.

(57) ABSTRACT

A buffer conveyor comprises a drivable endless conveyor belt which successively follows a transport path from an input station to an output station and a return path. A frame includes two parallel transport path frame legs and a U-shaped transport path bridge. The transport path bridge includes a curved bridge portion and parallel bridge legs extending therefrom. Each transport path frame leg is provided with a transport path frame guide for a lateral contact side of the belt in outward direction as seen from the other frame leg. The transport path bridge is shaped such that along the curved bridge portion and respective twisted regions of the bridge legs adjacent to the curved bridge (Continued)

portion the belt has a transverse down-slope towards the inside of the U-shape and such that the lateral contact side (of the belt at said twisted regions is above the respective transport path frame guides.

15 Claims, 6 Drawing Sheets

(58) Field of Classification Search
USPC .................................................... 198/347.1
See application file for complete search history.

(56) References Cited

U.S. PATENT DOCUMENTS

| | | | |
|---|---|---|---|
| 6,079,553 A | 6/2000 | Takahashi et al. | |
| 6,591,963 B2 | 7/2003 | Wipf | |
| 7,219,788 B2 | 5/2007 | Tuck et al. | |
| 8,365,905 B2 | 2/2013 | Fege | |
| 8,931,623 B2 * | 1/2015 | Deflandre | B65G 47/5131 |
| | | | 198/594 |
| 9,145,270 B2 | 9/2015 | Touitou et al. | |
| 9,409,715 B2 | 8/2016 | Balk | |
| 9,434,549 B2 | 9/2016 | Balk | |
| 9,856,089 B2 | 1/2018 | Balk | |
| 9,896,271 B1 * | 2/2018 | Steeber | B65G 47/5122 |
| 10,259,664 B2 * | 4/2019 | Balk | B65G 47/5122 |
| 2002/0195317 A1 | 12/2002 | Wipf | |
| 2005/0279616 A1 | 12/2005 | Pogue | |
| 2006/0225989 A1 | 10/2006 | Tuck et al. | |
| 2008/0142336 A1 | 6/2008 | Kronseder et al. | |
| 2014/0367228 A1 | 12/2014 | Laverdiere et al. | |
| 2015/0021143 A1 * | 1/2015 | Seger | B65G 47/5131 |
| | | | 198/347.1 |
| 2015/0291360 A1 | 10/2015 | Balk | |
| 2015/0375941 A1 | 12/2015 | Balk | |
| 2016/0368712 A1 | 12/2016 | Balk | |

FOREIGN PATENT DOCUMENTS

| | | | | |
|---|---|---|---|---|
| EP | 2431305 | * | 3/2012 | ............. B65G 17/48 |
| EP | 2960187 | A1 | 12/2015 | |
| WO | 0198187 | A1 | 12/2001 | |
| WO | 2014073961 | A1 | 5/2014 | |

* cited by examiner

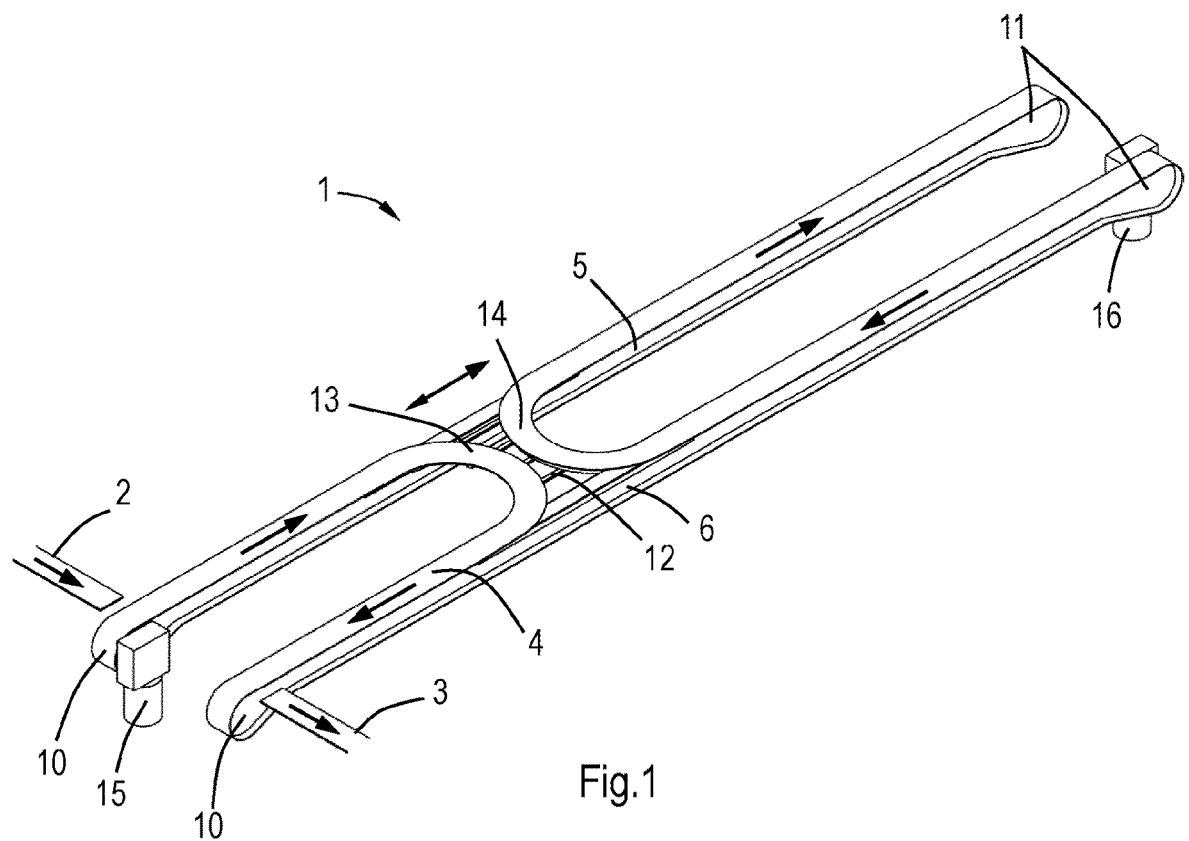
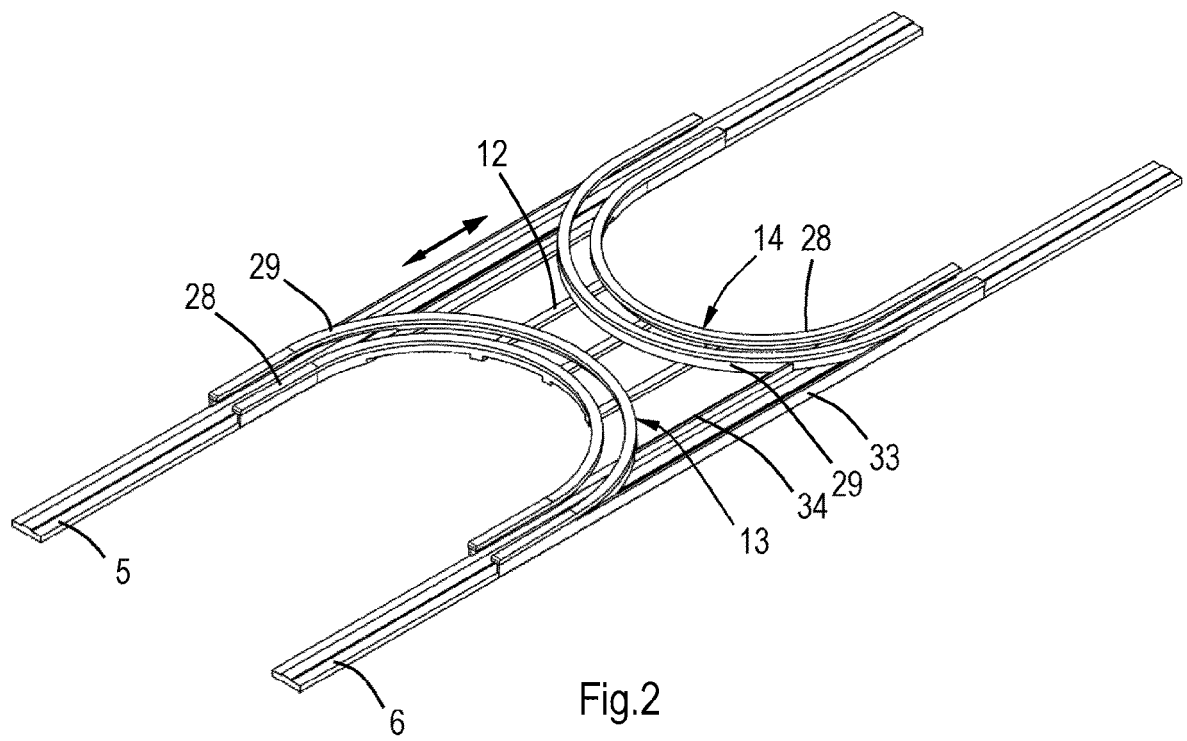

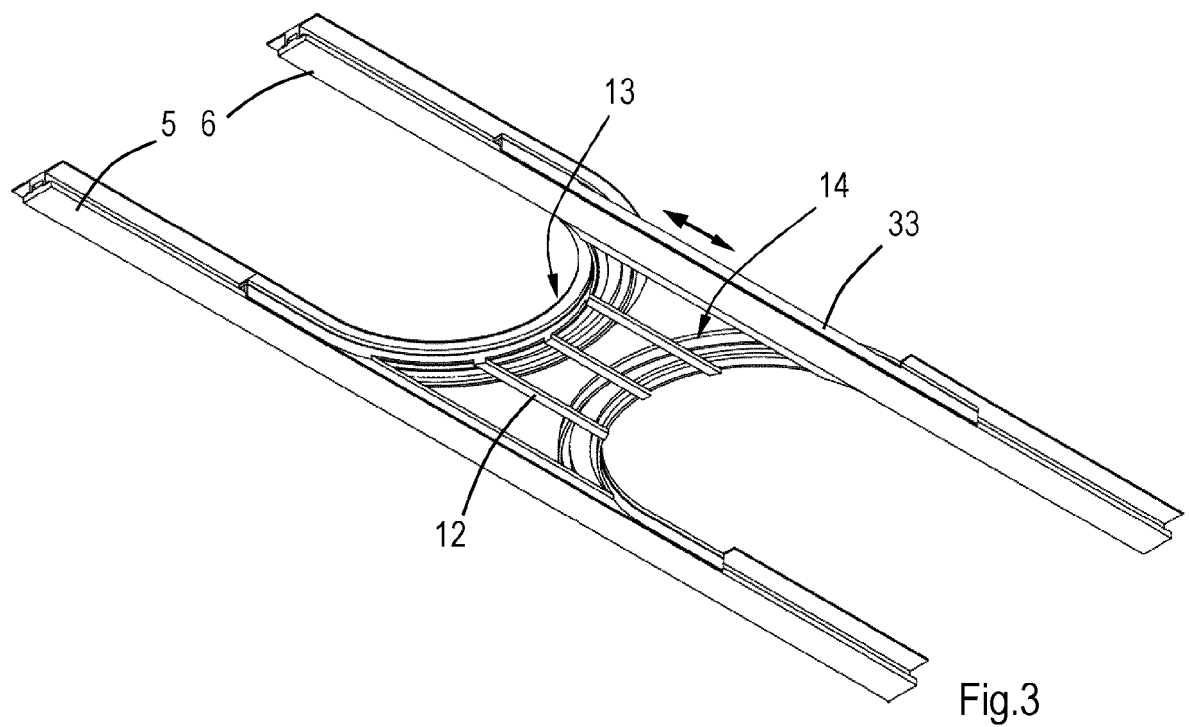
Fig.3
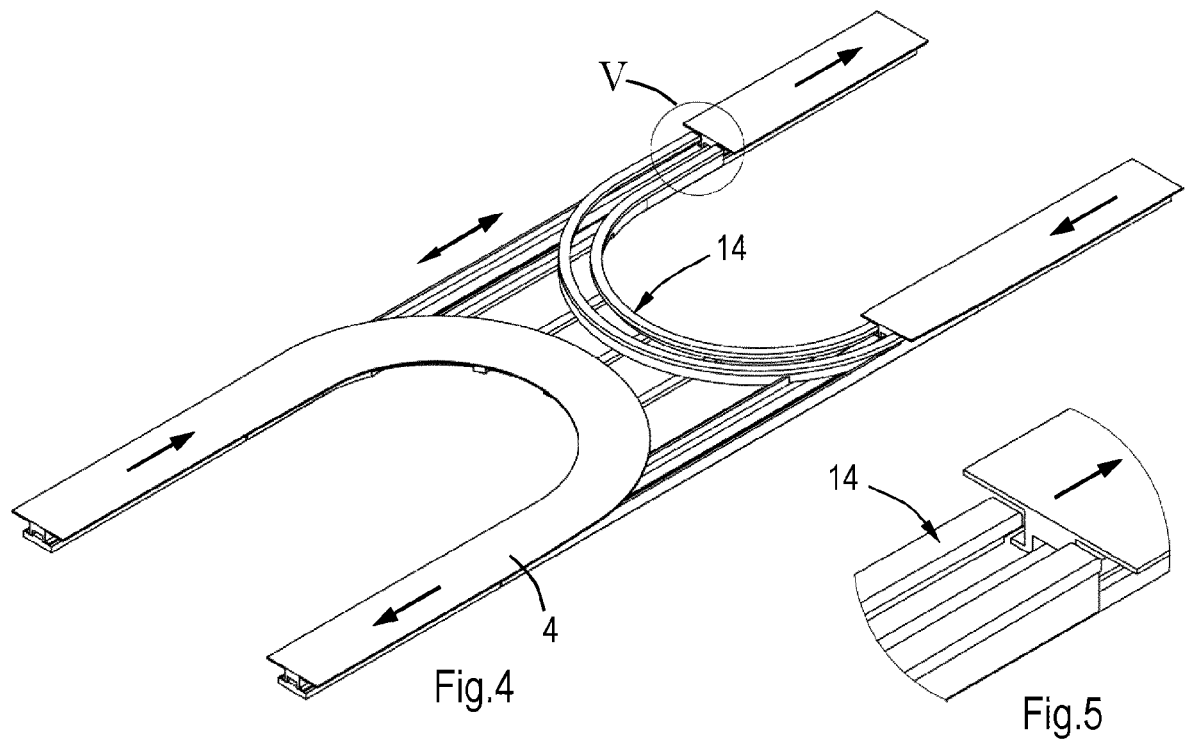
Fig.4
Fig.5

BUFFER CONVEYOR

CROSS-REFERENCE TO RELATED APPLICATION(S)

This Application is a Section 371 National Stage Application of International Application No. PCT/EP2020/075703, filed Sep. 15, 2020 and published as WO 2021/052930 A1 on Mar. 25, 2021, and further claims priority to European Application Ser. No. 19199494.6, filed Sep. 25, 2019 and U.S. Provisional Application Ser. No. 62/902,014, filed Sep. 18, 2019.

BACKGROUND

The present invention relates to a buffer conveyor, comprising a frame, an input station and an output station, a drivable endless conveyor belt which successively follows a transport path from the input station to the output station and a return path from the output station to the input station, wherein the lengths of the transport path and the return path are inversely adjustable, wherein at the transport path the frame is provided with two parallel transport path frame legs for guiding the conveyor belt along the transport path frame legs and a U-shaped transport path bridge for guiding the conveyor belt between the transport path frame legs, wherein the transport path bridge includes a curved bridge portion and parallel bridge legs extending from the curved bridge portion, which transport path bridge is at least partly located between the transport path frame legs and displaceable along the transport path frame legs, wherein within the transport path the conveyor belt successively follows from the input station one of the transport path frame legs, one of the bridge legs, the curved bridge portion, the other one of the bridge legs and the other one of the transport path frame legs to the output station.

Such a buffer conveyor is known from EP 2 960 187. The known buffer conveyor has an endless conveyor belt which follows the transport path from the input station along a first frame leg to the U-shaped bridge and via the bridge to a second frame leg and along the second frame leg to the output station. The U-shaped bridge reverses the direction of conveyance of the conveyor belt such that the direction along the first frame leg is opposite to the direction along the second frame leg. After leaving the transport path at the output station the conveyor belt follows the return path after which it returns at the input station in order to follow the transport path again. The lengths of the transport path and the return path are inversely adjustable, which means that when the transport path becomes longer the return path becomes proportionally shorter. In other words, the return path compensates length variations of the transport path. This allows the transport path to be used as a buffer or a storage of products which are supplied to the conveyor belt at the input station and discharged at the output station.

SUMMARY

In a buffer conveyor, each of the transport path frame legs is provided with a transport path frame guide for supporting a lateral contact side of the conveyor belt in outward direction as seen from the other transport path frame leg, wherein the transport path bridge is shaped such that along the curved bridge portion and respective twisted regions of the bridge legs adjacent to the curved bridge portion the conveyor belt has a transverse down-slope towards the inside of the U-shape and such that the lateral contact side of the conveyor belt at said twisted regions is above the respective transport path frame guides.

The transverse down-slope has two functions: the resulting banked orientation of the conveyor belt allows a relatively high speed of the conveyor belt before products on the conveyor belt will tilt or move in outward direction of the curved bridge portion due to centrifugal forces, whereas the tilting angle is also used to free the lateral contact side of the conveyor belt from the corresponding transport path frame guide before it moves into the curved bridge portion and to bring the lateral contact side of the conveyor belt in contact with the corresponding transport path frame guide after leaving the curved bridge portion.

The conveyor belt may comprise a slat belt which can follow horizontal bends and vertical bends. It may be provided with mutually coupled and mutually movable slats, of which respective central portions are coupled to each other via a drivable endless chain. Each of the slats may have an upper plate for supporting a product, two L-shaped feet which are directed away from each other and a core between the upper plate and the L-shaped feet. Numerous alternative shapes of slat belts are conceivable.

The bridge legs may be provided with respective transfer regions between free ends thereof and the twisted regions, wherein the transfer regions are adapted such that the transverse down-slope of the conveyor belt gradually decreases in a direction from the twisted regions to the free ends. This provides the opportunity to create a smooth transfer between the transfer regions and the respective twisted regions. For example, at the free ends of the bridge legs the transverse down-slope may be zero.

In a preferred embodiment at portions of the respective transfer regions remote from the twisted regions the conveyor belt is supported upwardly by both the transport path frame legs and the bridge legs, since this creates a smooth transfer between the transport path frame legs and the bridge legs. At least in the mentioned portions the bridge legs and the transport path frame legs support the conveyor belt at different locations thereof as seen in cross-section of the conveyor belt. For example, when applying the slat belt as mentioned hereinbefore, the transport path frame legs may support the L-shaped feet whereas the bridge legs at the mentioned portions may support the upper plate of each of the slats.

In a particular embodiment the transport path lies in a transport plane and the transport path frame legs and the bridge legs are straight when viewed in perpendicular direction towards the transport plane, i.e. when seen from above when the transport plane is horizontal.

At the return path the frame may be provided with two parallel return path frame legs for guiding the conveyor belt along the return path frame legs and a U-shaped return path bridge for guiding the conveyor belt between the return path frame legs, wherein the return path bridge is at least partly located between the return path frame legs and displaceable along the return path frame legs, wherein within the return path the conveyor belt successively follows from the output station one of the return path frame legs, the return path bridge and the other one of the return path frame legs to the input station. The return path bridge may be similar to the transport path bridge.

In a particular embodiment, at the input station and the output station the buffer conveyor is provided with respective reverse members for turning the conveyor belt upside down, such that the return path extends at least partly in a lower plane which lies below the transport plane. This part can be defined as the reversed part of the return path. The reversed part may also entirely extend in the lower plane. The reverse members may be reverse rollers or reverse wheels or the like.

In a further embodiment the reverse members are first reverse members and the buffer conveyor comprises respective second reverse members for turning the conveyor belt upside down, which second reverse members are functionally located between the return path bridge and the first reverse members, such that the return path partly extends in a return path bridge plane which lies at a different level than the lower plane. The return path bridge is movable within the return path bridge plane. In practice, the return path bridge plane may lie above the lower plane such that the conveyor belt is bent in only one direction at the first and second reverse members.

The return path bridge plane and the transport plane may form a common plane. More specifically, one of the transport path frame legs and one of the return path frame legs may form a common first frame leg, and the other one of the transport path frame legs and the other one of the return path frame legs may form a common second frame leg. In this case the conveyor belt uses the common first frame leg and the common second frame leg within both the transport path and the return path.

In an alternative embodiment the return path bridge plane lies between the transport plane and the lower plane. In this case the transport path bridge and the return path bridge move along their cooperating transport path frame legs and return path frame legs, respectively. Since the transport plane lies above the return path bridge plane a compact buffer conveyor in longitudinal direction of the transport path frame legs and the return path frame legs can be obtained.

The transport path bridge and the return path bridge may be fixed to each other.

The invention is also related to a buffer conveyor, comprising a frame, an input station and an output station, a drivable endless conveyor belt which successively follows a transport path from the input station to the output station and a return path from the output station to the input station, wherein the lengths of the transport path and the return path are inversely adjustable, wherein at the transport path the frame is provided with two parallel transport path frame legs for guiding the conveyor belt along the transport path frame legs and a U-shaped transport path bridge for guiding the conveyor belt between the transport path frame legs, which transport path bridge is at least partly located between the transport path frame legs and displaceable along the transport path frame legs, wherein within the transport path the conveyor belt successively follows from the input station one of the transport path frame legs, the transport path bridge and the other one of the transport path frame legs to the output station, wherein each of the transport path frame legs is provided with a transport path frame guide for supporting a lateral contact side of the conveyor belt in outward direction as seen from the other transport path frame leg, wherein the transport path frame guides are part of respective flexible strips which are in engagement with the transport path bridge such that the flexible strips are locally moved downwardly so as to move the transport path frame guide below the lateral contact side of the conveyor belt at an upstream and a downstream side of the transport path bridge. The downward displacement of the flexible strips allows the conveyor belt to move in transverse direction from one of the transport path frame legs at the upstream side of the transport path bridge in order to follow the transport path bridge and to allow the conveyor belt to be placed at the other transport path frame leg at the downstream side of the transport path bridge before the corresponding flexible strip is lifted at a location further downstream in order to support the lateral contact side of the conveyor belt by the transport path frame guide. An advantage of this buffer conveyor is its relatively simple structure.

Each of the flexible strips may be supported by the frame by spring elements which are locally loaded when the transport path bridge passes.

In a particular embodiment the conveyor belt is a slat belt including a plurality of interconnected slats, wherein each of the slats has an upper plate for supporting a product and two feet located below the upper plate and at a distance from each other in transverse direction of the conveyor belt, wherein the flexible strip extends between the feet. Inner sides of the feet of the respective slats form the lateral contact side of the conveyor belt. The feet may be L-shaped feet which are directed away from each other in transverse direction of the conveyor belt. The feet may be located at either side of a centre of the slat in transverse direction of the conveyor belt.

In a further embodiment the transport path frame guide is an outer transport path frame guide and each of the flexible strips also comprises an inner transport path frame guide which extends at an opposite side of the flexible strip, wherein the flexible strip fits between the two feet of each slat so as to keep the slats on track along the transport path frame legs.

BRIEF DESCRIPTION OF THE DRAWINGS

Aspects of the invention will hereafter be elucidated with reference to very schematic drawings showing embodiments of the invention by way of example.

FIG. 1 is a perspective view of an embodiment of a buffer conveyor.

FIG. 2 is a similar view as FIG. 1, but showing a part of the buffer conveyor on a larger scale.

FIG. 3 is a similar view as FIG. 2, but showing the part as seen from below.

FIG. 4 is a similar view as FIG. 2, showing a part of a conveyor belt.

FIG. 5 is an enlarged view of a part of FIG. 4, which is indicated by V in FIG. 4.

DETAILED DESCRIPTION OF THE ILLUSTRATIVE EMBODIMENTS

Figure 6:
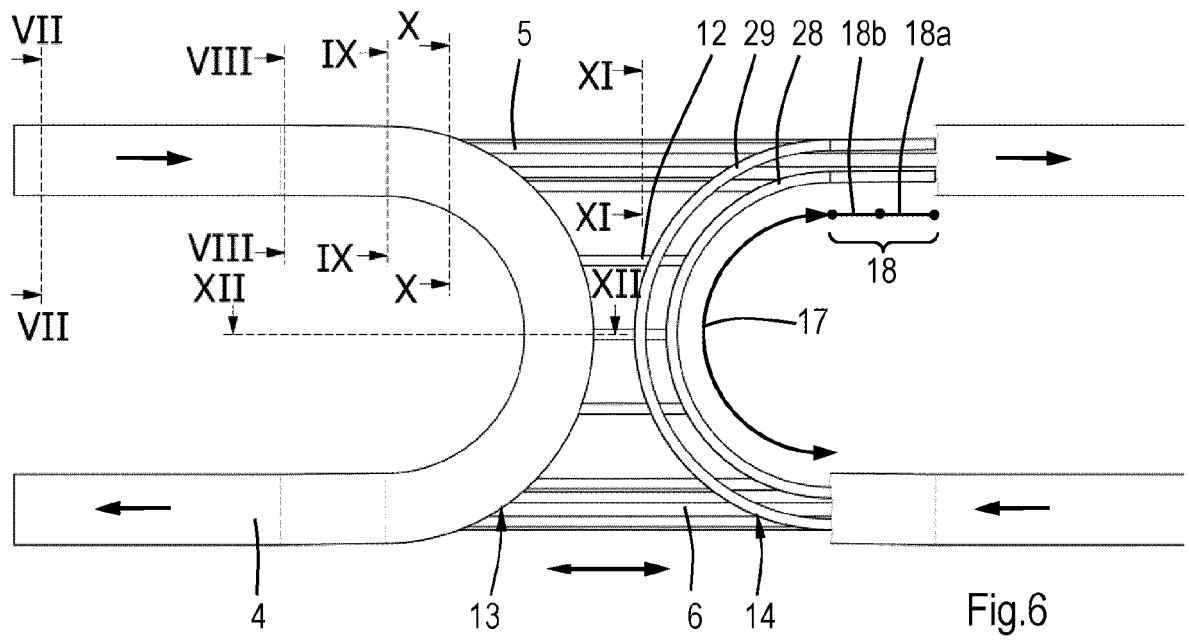
FIG. 6 is a plan view of the part as shown in FIG. 4.

FIG. 1 shows an embodiment of a buffer conveyor. The buffer conveyor 1 has an input station 2, an output station 3 and a single, endless and flexible conveyor belt 4. Under operating conditions products are supplied onto the conveyor belt 4 at the input station 2 and products are discharged from the conveyor belt 4 at the output station 3. The conveyor belt 4 successively follows a transport path from the input station 2 to the output station 3 and a return path from the output station 3 to the input station 2 as shown by single-headed arrows in FIG. 1.

The buffer conveyor 1 has a frame including a first frame leg 5 and a second frame leg 6 which are straight and extend parallel to each other as seen from above. The input station 2 and the output station 3 have fixed locations with respect to the first and second frame legs 5, 6, but have different locations then shown in FIG. 1. At front ends of the first and second frame legs 5, 6, where the input and output stations 2, 3 are located, respective first reverse members in the form of first reverse rollers 10 are provided for turning the conveyor belt 4 upside down between the transport path and the return path. At rear ends of the first and second frame legs 5, 6 which are located opposite to the front ends thereof respective second reverse members in the form of second reverse rollers 11 are provided for turning the conveyor belt 4 upside down between a reversed part of the return path and a non-reversed part of the return path. In this case the transport path lies in a transport plane, whereas the non-reversed part of the return path also lies in the transport plane. The reversed part of the return path lies in a lower plane which lies below the transport plane.

The buffer conveyor 1 is also provided with a carriage 12 which is partly located between the first and second frame legs 5, 6 and which is displaceable along a straight line parallel to the first and second frame legs 5, 6. The displaceability is indicated in FIG. 1 by a double-headed arrow. A U-shaped transport path bridge 13 and a U-shaped return path bridge 14 are mounted on an upper side of the carriage 12.

The conveyor belt 4 is driven by electric motors 15, 16 which are mounted to the first frame leg 5 at its front end and to the second frame leg 6 at its rear end, respectively. The electric motors 15, 16 are drivably coupled to the corresponding first and second reverse rollers 10, 11 at the mentioned locations.

FIGS. 2 and 3 show the carriage 12, the transport path bridge 13, the return path bridge 14, a part of the first frame leg 5 and a part of the second frame leg 6 without the conveyor belt 4. FIGS. 4 and 6 show a part of the return path bridge 14 without the conveyor 4. Referring to FIG. 6, each of the transport path and return path bridges 13, 14 has a curved bridge portion 17 and a pair of parallel and straight bridge legs 18 extending from the curved bridge portion 17. The transport path bridge 13 and the return path bridge 14 are similar in this case, but their respective pairs of bridge legs 18 are directed in opposite directions. The first and second frame legs 5, 6, the transport path bridge 13 and the return path bridge 14 guide the conveyor belt 4 along the transport path and the return path. Parts of the respective curved bridge portions 17 extend between the first and second frame leg 5, 6. Each of the curved bridge portions 17 follows a demi-circle in this case, but an alternatively shaped U-track is conceivable.

The bridge legs 18 cooperate with the first and second frame legs 5, 6 in order to provide a gradual transfer of the conveyor belt 4 between the first and second frame legs 5, 6 on the one hand, and the transport path and the return path bridges 13, 14, on the other hand. In the transport path the conveyor belt 4 follows an upper side of the first frame leg 5 from the first reverse roller 10 at the front end of the first frame leg 5, then successively one of the bridge legs 18, the curved bridge portion 17 and the other one of the bridge legs 18 of the transport path bridge 13, and subsequently an upper side of the second frame leg 6 to the first reverse roller 10 at the front end of the second frame leg 6. In the return path the conveyor belt 4 follows from the first reverse roller 10 at the front end of the second frame leg 6 an underside of the second frame leg 6 to the reverse roller 11 at the rear end of the second frame leg 6, where the conveyor belt 4 is turned upside down, subsequently the upper side of the second frame leg 6, then successively one of the bridge legs 18, the curved bridge portion 17 and the other one of the bridge legs 18 of the return path bridge 14, and subsequently the upper side of the first frame leg 5 to the reverse roller 11 at the rear end of the first frame leg 5, where the conveyor belt 4 is turned upside down, then an underside of the first frame leg 5 to the first reverse roller 10 at the front end of the first frame leg 5. The transport path forms a first loop which lies in the transport plane, whereas the return path forms a second loop which partly lies in the transport plane and partly lies in a lower plane below the transport plane. It is noted that in the embodiment as shown in FIG. 1 both in the transport path and in the return path the conveyor belt 4 follows the upper sides of the first and second frame legs 5, 6, but it is conceivable that the transport path uses upper sides of only its own first and second transport path frame legs and the return path uses upper sides of only its own first and second return path frame legs, for example when the distance between the transport path bridge 13 and the return path bridge 14 would be relatively large.

The lengths of the transport path and the return path are inversely adjustable by moving the carriage 12 along the first and second frame legs 5, 6. When the carriage 12 moves in a direction from the front ends of the first and second frame legs 5, 6 towards the rear ends of the first and second frame legs 5, 6, the length of the transport path between the input station 2 and the output station 3 increases, whereas the length of the return path decreases proportionally. The electric motors 15, 16 can be driven independently of one another. Driving generally takes place via a control unit which controls the conveying process. If the electric motors 15, 16 are driven at different speeds the carriage 12 is moved, resulting in varying buffer capacity of the buffer conveyor 1.

Figure 7:
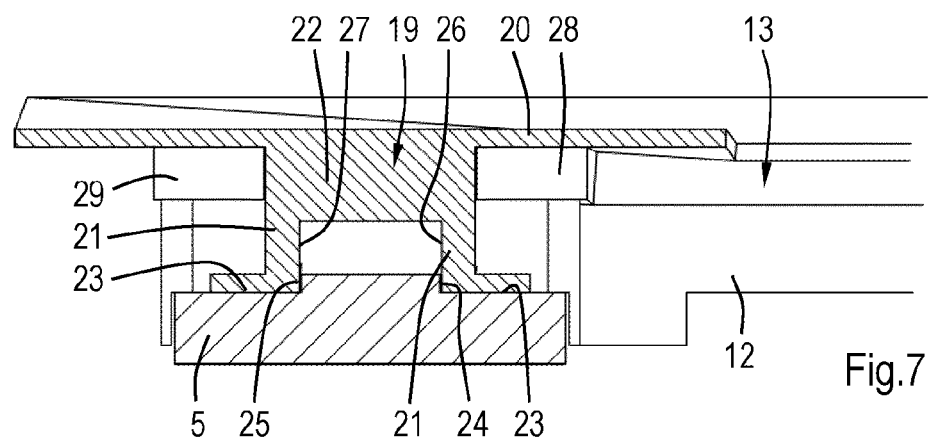
FIG. 7 is a cross-sectional view along the line VII-VII in FIG. 6.

In the embodiment as shown in FIG. 1 the conveyor belt 4 comprises a slat belt which can follow horizontal bends and vertical bends. The conveyor belt 4 is provided with mutually coupled and mutually movable slats 19, of which respective central portions are coupled to each other via a drivable endless chain (not shown), but alternative conveyor belts are conceivable. FIG. 7 shows that each slat 19 has an upper plate 20 for supporting a product, two L-shaped feet 21 which are directed away from each other in transverse direction of the conveyor belt 4 and a core 22 between the upper plate 20 and the L-shaped feet 21.

Referring to FIG. 7, each of the first and second frame legs 5, 6 has upwardly directed frame leg guides 23 for supporting the respective L-shaped feet 21 of each of the slats 19 in upward direction. Each of the first and second frame legs 5, 6 is provided with an inner transverse guide 24 and an outer transverse guide 25 for keeping the conveyor belt 4 on track. The inner transverse guides 24 of the first and second frame legs 5, 6 are directed to each other, whereas the outer transverse guides 25 are directed away from each other. In the embodiment as shown in FIG. 7 the inner and outer transverse guides 24, 25 are located on either side of respective projections on the respective upper sides of the first and second frame legs 5, 6. At each of the first and second frame legs 5, 6 the upwardly directed frame leg guides 23 are located at either side of the projection. FIG. 7 shows that the projection is received in hollow spaces of the slats 19 extending at a centre of the slat 19 between the L-shaped feet 21. The inner and outer transverse guides 24, 25 contact the slats 19 at respective inner and outer lateral contact sides 26, 27 thereof. The inner and outer lateral contact sides 26, 27 are rear surfaces of the L-shaped feet 21 which are directed to each other.

It is noted that the outer transverse guide 25 of one of the first and second frame legs 5, 6 represents a transport path frame guide, which supports an outer lateral contact side of the conveyor belt 4 in outward direction as seen from the other one of the first and second frame legs 5, 6. The outer lateral contact side of the conveyor belt 4 is formed by the respective outer lateral contact sides 27 of the slats 19.

In the situation as illustrated in FIG. 7 the slat 19 is supported in upward direction by the frame leg guides 23 only and still at a distance from the transport path bridge 13. A comparable situation is illustrated in FIGS. 4 and 5 where the visible slat is just leaving the return path bridge 14.

Each of the transport path and return path bridges 13, 14 has an inner rail 28 and an outer rail 29 which extend parallel to each other. Each of the inner and outer rails 28, 29 has an upwardly directed rail guide 30 for supporting the upper plates 20 of the slats 19 in upward direction, see FIG. 8. The inner rail 28 is provided with an inner lateral guide 31 and the outer rail 29 is provided with an outer lateral guide 32 for guiding the conveyor belt 4 through the transport path and the return path bridges 13, 14. The free ends of the inner and outer rails 28, 29 rest on the first and second frame legs 5, 6. When the carriage 12 moves along the first and second frame legs 5, 6 the free ends of the inner and outer rails 28, 29 slide on the frame leg guides 23. The outer rails 29 of the transport path bridge 13 and the return path bridge 14 are fixed to each other through respective bars 33, 34 as shown in FIG. 2.

Figure 8:
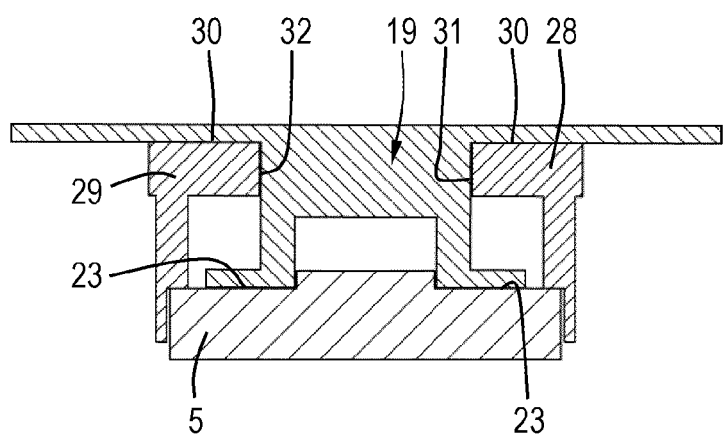
FIG. 8 is a cross-sectional view along the line VIII-VIII in FIG. 6.

FIG. 7 illustrates that the slat 19 is approaching the free ends of the inner and outer rails 28, 29 of one of the bridge legs 18 of the transport path bridge 13. FIG. 8 illustrates that the slat 19 is upwardly supported by both the first frame leg 5 and the inner and outer rails 28, 29 of one of the bridge legs 18 of the transport path bridge 13.

Figure 12:
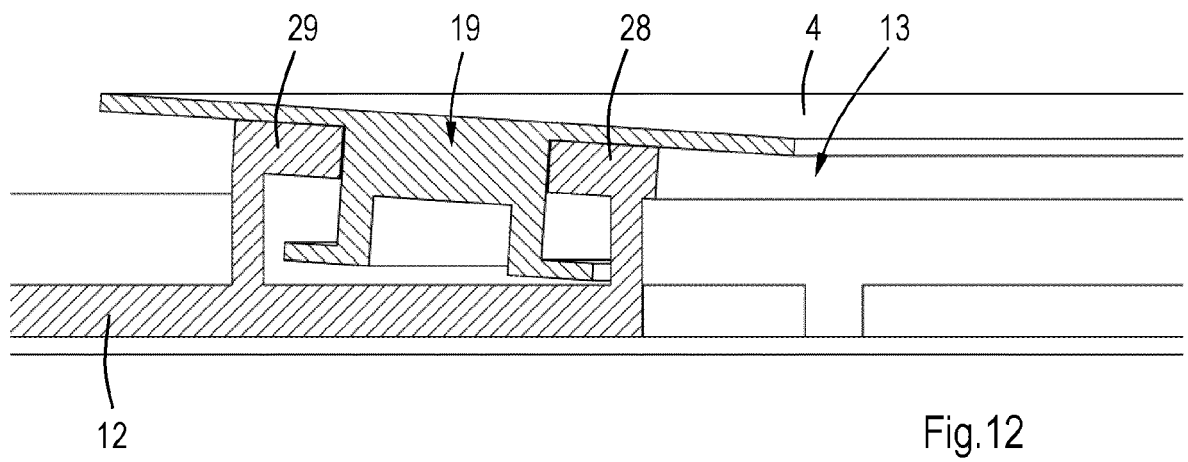
FIG. 12 is a cross-sectional view along the line XII-XII in FIG. 6.

The inner and outer rails 28, 29 of the transport path and the return path bridges 13, 14 are shaped such that along the curved bridge portions 17 the conveyor belt 4 has a transverse down-slope towards the inside of the U-shape. This is shown in FIG. 12.

The transverse down-slope already starts at the bridge legs 18 between the respective free ends of the inner and outer rails 28, 29 of the bridge legs 18 and the curved bridge portion 17. Referring to FIG. 6, each of the bridge legs 18 can be subdivided in a transfer region 18*a* and a twisted region 18*b*. The transfer region 18*a* extends from the free end of the corresponding bridge leg 18, whereas the twisted region 18*b* is formed by a portion of the bridge leg 18 adjacent to the curved bridge portion 17. The twisted region 18*b* extends between the transfer region 18*a* and the curved bridge portion 17.

Figure 9:
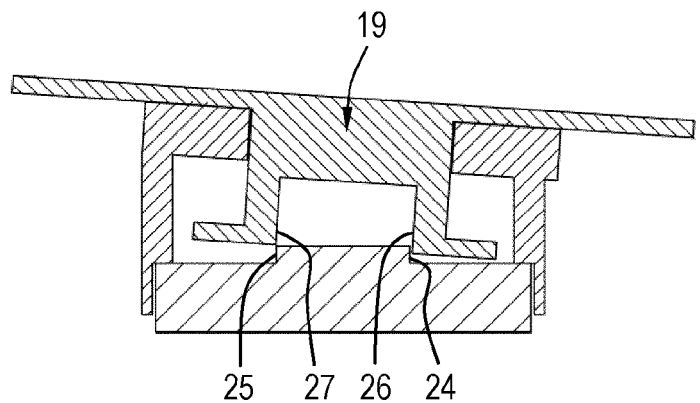
FIG. 9 is a cross-sectional view along the line IX-IX in FIG. 6.
Figure 10:
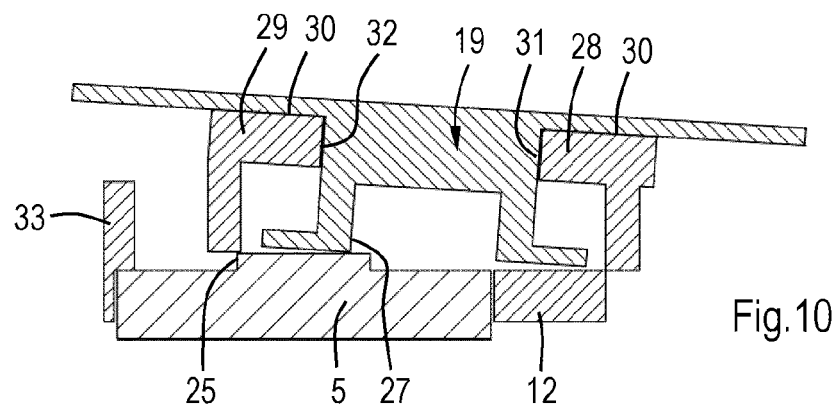
FIG. 10 is a cross-sectional view along the line X-X in FIG. 6.

As indicated hereinbefore and shown in FIG. 8, within portions of the respective transfer regions 18*a* at their free ends the conveyor belt 4 is supported upwardly by the frame leg guides 23 as well as by the upwardly directed rail guides 30 of the inner and outer rails 28, 29. Following the transfer region 18*a* towards the twisted region 18*b* the height level of the upwardly directed rail guide 30 of the outer rail 29 increases stronger with respect to the height level of the upwardly directed rail guide 30 of the inner rail 28. Consequently, the transverse down-slope of the conveyor belt 4 gradually increases in a direction away from the free ends of the inner and outer rails 28, 29. Within the twisted regions 18*b* the transverse down-slope of the conveyor belt 4 is such that the outer lateral contact side 27 of the conveyor belt 4 at the twisted regions 18*b* is above the corresponding outer transverse guides 25 of the first and second frame legs 5, 6. This situation is shown in FIG. 9. This allows the conveyor belt 4 to be displaced in transverse direction, i.e. between the first and second frame legs 5, 6, which is illustrated in FIG. 10. It is noted that the outer rail 29 is adapted such that it extends across the projections on the upper sides of the respective first and second frame legs 5, 6.

Figure 11:
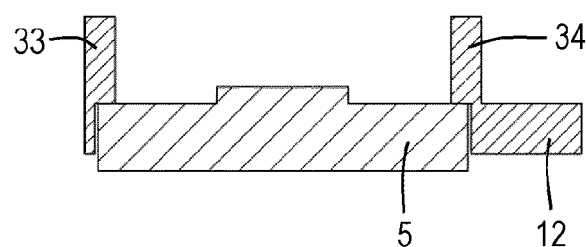
FIG. 11 is a cross-sectional view along the line XI-XI in FIG. 6.

FIG. 11 shows a cross-section of the first frame leg 5 and a part of the carriage 12 at a location between the transport path and the return path bridges 13, 14, illustrating that the bars 33, 34 slide on the frame leg guides 23.

The angle of the transverse down-slope slope may be small, for example in the range of 1-5° with respect to a horizontal plane. It is noted that the inner and outer transverse guides 24, 25 and cooperating inner and outer lateral contact sides 26, 27 may be shaped such that friction during tilting of the slats 19 within the transfer regions 18*a* is minimized, for example through curved contact surfaces.

Figure 13:
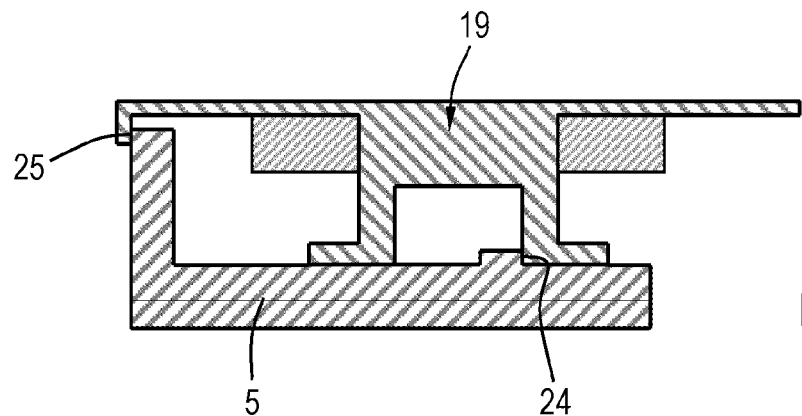
FIGS. 13 and 14 are similar views as FIG. 8, but showing alternative embodiments.
Figure 14:
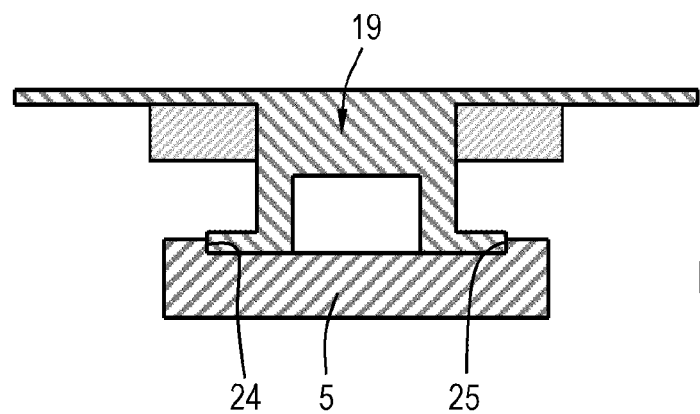

Furthermore, numerous alternative configurations of guidance of the conveyor belt 4 along the first and second frame legs 5, 6 and the transport path and return path bridges 13, 14 are conceivable. For example, FIGS. 13 and 14 show alternative embodiments, in which the inner and outer transverse guides 24, 25 have different locations. A larger distance between the outer transverse guide 25 and the centre of the U-shape requires a smaller transverse down-slope for making the outer lateral contact sides 27 of the slats 19 free from the outer transverse guide 25, i.e. the embodiment of FIG. 13 requires a smaller angle than the embodiment of FIG. 14.

Figure 15:
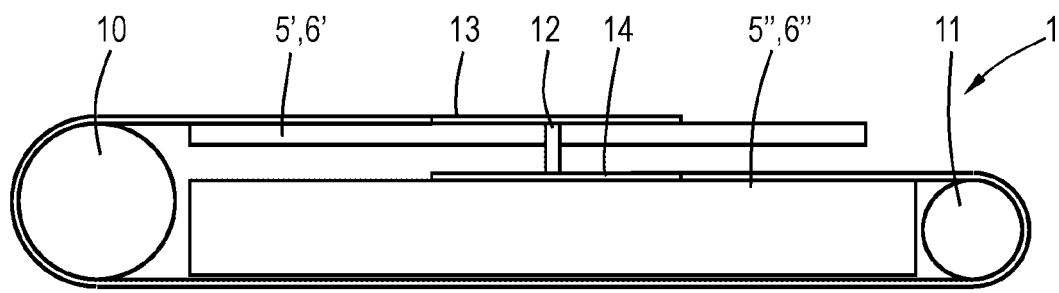
FIG. 15 is a side view of an alternative embodiment of the buffer conveyor.

FIG. 15 shows an alternative embodiment of the buffer conveyor. In this case the first reverse rollers 10 have larger diameters than the second reverse rollers 11. Similar to the embodiment as shown in FIG. 1 the second reverse rollers 11 are functionally located between the return path bridge 14 and the first reverse rollers 10, and the reversed part of the return path lies in the lower plane, but the non-reversed part of the return path lies between the transport plane and the lower plane. Within the transport path the conveyor belt 4 successively follows from the input station 2 a first transport path frame leg 5', the transport path bridge 13 and a second transport path frame leg 6' to the output station 3. For explanatory reasons the input station 2 and the output station 3 are not shown in FIG. 15. Within the return path the conveyor belt 4 successively follows from the output station 3 a second return path frame leg 6", the return path bridge 14 and a first return path frame leg 6" to the input station 2. Between the return path bridge 14 and the first reverse rollers 10 the conveyor belt 4 is turned upside down at the second reverse rollers 11 at the rear ends of the first and second return path frame legs 5" and 6". The transport path bridge 13 and the return path bridge 14 as shown in FIG. 15 are mounted above each other to the carriage 12, but alternative locations are conceivable. The first and second return path frame legs 5", 6" are located below the first and second transport path frame legs 5', 6'. In fact, in the embodiment as shown in FIG. 1 the first and second transport path frame legs 5', 6' are integrated with the first and second return path frame legs 5" and 6" into the first and second frame legs 5, 6.

The arrangement of the buffer conveyor 1 as shown in the embodiment of FIG. 15 is not necessarily related to the transverse down-slope at the transport path and return path bridges 13, 14. In other words, the invention is also related to the following aspects:

Aspect 1: A buffer conveyor, comprising a frame, an input station and an output station, a drivable endless conveyor belt which successively follows a transport path from the input station to the output station and a return path from the output station to the input station, wherein the lengths of the transport path and the return path are inversely adjustable, wherein at the transport path the frame is provided with two parallel transport path frame legs for guiding the conveyor belt along the transport path frame legs and a U-shaped transport path bridge for guiding the conveyor belt between the transport path frame legs, wherein the transport path bridge is at least partly located between the transport path frame legs and displaceable along the transport path frame legs, wherein within the transport path the conveyor belt successively follows from the input station one of the transport path frame legs, the transport path bridge and the other one of the transport path frame legs to the output station, wherein the transport path lies in a transport plane, wherein at the return path the frame is provided with two parallel return path frame legs for guiding the conveyor belt along the return path frame legs and a U-shaped return path bridge for guiding the conveyor belt between the return path frame legs, wherein the return path bridge is at least partly located between the return path frame legs and displaceable along the return path frame legs, wherein within the return path the conveyor belt successively follows from the output station one of the return path frame legs, the return path bridge and the other one of the return path frame legs to the input station, wherein at the input station and the output station the buffer conveyor is provided with respective first reverse members for turning the conveyor belt upside down, such that a reversed part of the return path extends in a lower plane which lies below the transport plane, wherein the buffer conveyor comprises respective second reverse members for turning the conveyor belt upside down, which second reverse members are functionally located between the return path bridge and the first reverse members, such that a non-reversed part of the return path extends in a return path bridge plane which lies at a different level than the transport plane. This provides a compact buffer conveyor in longitudinal direction of the transport path frame legs and the return path frame legs. In the non-reversed part of the return path a product-supporting side of the conveyor belt is upwardly directed, similar to the orientation within the transport path.

Aspect 2: A buffer conveyor according to aspect 1, wherein the return path bridge plane lies between the transport plane and the lower plane.

Figure 16:
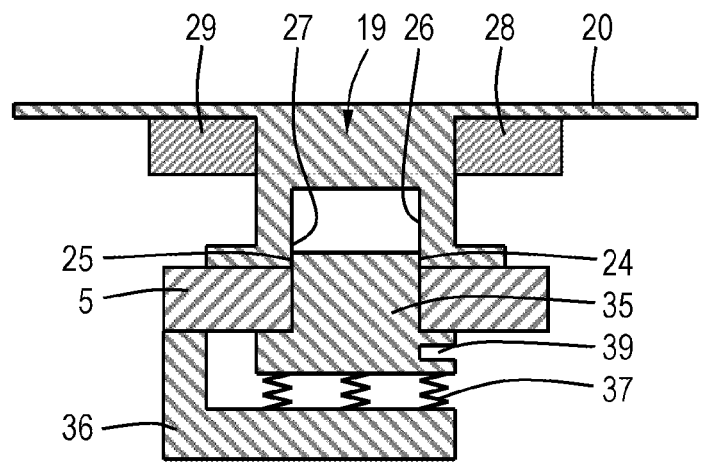
FIG. 16 is a similar view as FIG. 8, but showing an alternative embodiment.
Figure 17:
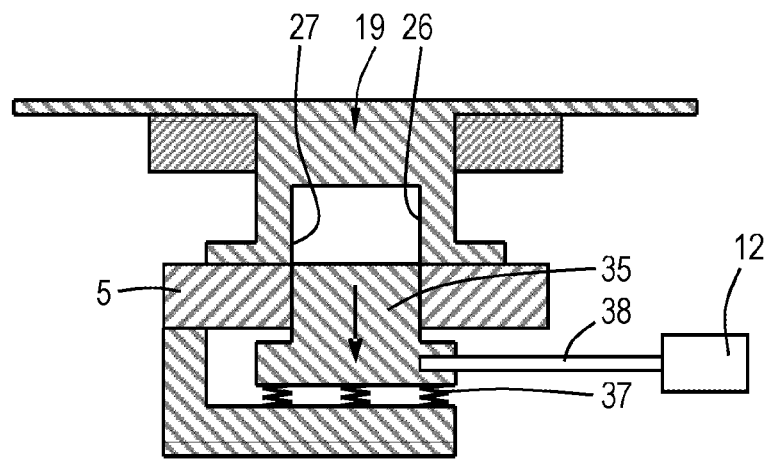
FIG. 17 is a similar view as FIG. 16, showing the alternative embodiment in a different condition.

FIGS. 16 and 17 show another alternative embodiment in which the conveyor belt 4 is not necessarily twisted in order to make the outer lateral contact sides 27 of the slats 19 free from the outer transverse guides 25. In this embodiment the outer transverse guides 25 are part of respective flexible strips 35. The flexible strips 35 are supported by brackets 36 which are fixed to the first and second frame legs 5, 6 through spring elements 37. The flexible strips 35 are in engagement with respective actuators 38 of the carriage 12. In this case the actuators 38 are lateral projections which fit in cooperating grooves 39 of the respective flexible strips 35. The grooves 39 extend in longitudinal direction of the flexible strips 35 and the actuators 38 slide along the grooves when being displaced along the first and second frame legs 5, 6. The actuators 38 are arranged such that the flexible strips 35 are locally moved downwardly when the carriage 12 passes in order to move at least the outer transverse guides 25 below the lateral contact side 27 of the conveyor belt 4 at an upstream and a downstream side of the transport and return path bridges 13, 14. The spring elements 37 will be compressed when the carriage 12 passes and push the flexible strips 35 upwardly when the carriage 12 has passed such that the outer transverse guides 25 support the lateral contact sides 27 of the slats 19 at a distance from the transport and return path bridges 13, 14. FIG. 16 illustrates a situation at a location along the first frame leg 5 remote from the actual location of the carriage 12, whereas FIG. 17 illustrates a situation at an upstream location of the transport path bridge 13.

In the embodiment as shown in FIGS. 16 and 17 at each flexible strip 35 the inner transverse guide 24 extends at an opposite side of the outer transverse guide 25. The distance between the opposite sides is complementary to the distance between the L-shaped feet 21 of each slat 19. Consequently, the flexible strip 35 fits between the opposite L-shaped feet 21 of each slat 19 so as to keep the slats 19 on track along the first and second frame legs.

The invention is not limited to the embodiments shown in the drawings and described hereinbefore, which may be varied in different manners within the scope of the claims and their technical equivalents.

The invention claimed is:
1. A buffer conveyor, comprising:
an input station and an output station,
a drivable endless conveyor belt which successively follows a transport path from the input station to the output station and a return path from the output station to the input station, wherein the lengths of the transport path and the return path are inversely adjustable, and
a frame, wherein at the transport path the frame is provided with two parallel transport path frame legs for guiding the conveyor belt along the transport path frame legs and a U-shaped transport path bridge for guiding the conveyor belt between the transport path frame legs, wherein the transport path bridge includes a curved bridge portion and parallel bridge legs extending from the curved bridge portion, which transport path bridge is at least partly located between the transport path frame legs and displaceable along the transport path frame legs, wherein within the transport path the conveyor belt successively follows from the input station one of the transport path frame legs, one of the bridge legs, the curved bridge portion, the other one of the bridge legs and the other one of the transport path frame legs to the output station, wherein each of the transport path frame legs is provided with a transport path frame guide for supporting a lateral contact side of the conveyor belt in outward direction as seen from the other transport path frame leg, wherein the transport path bridge is shaped such that along the curved bridge portion and respective twisted regions of the bridge legs adjacent to the curved bridge portion the conveyor belt has a transverse down-slope towards the inside of the U-shape and such that the lateral contact side of the conveyor belt at said twisted regions is above the respective transport path frame guides.

2. The buffer conveyor according to claim 1, wherein the bridge legs are provided with respective transfer regions between free ends thereof and the twisted regions, wherein the transfer regions are configured such that the transverse down-slope of the conveyor belt gradually decreases in a direction from the twisted regions to the free ends.

3. The buffer conveyor according to claim 2, wherein at portions of the respective transfer regions remote from the twisted regions, the conveyor belt is supported upwardly by both the transport path frame legs and the bridge legs.

4. The buffer conveyor according to claim 1, wherein the transport path lies in a transport plane and the transport path frame legs and the bridge legs are straight when viewed in a perpendicular direction towards the transport plane.

5. The buffer conveyor according to claim 1, wherein at the return path the frame is provided with two parallel return path frame legs for guiding the conveyor belt along the return path frame legs and a U-shaped return path bridge for guiding the conveyor belt between the return path frame legs, wherein the return path bridge is at least partly located between the return path frame legs and displaceable along the return path frame legs, wherein within the return path the conveyor belt successively follows from the output station one of the return path frame legs, the return path bridge and the other one of the return path frame legs to the input station.

6. The buffer conveyor according to claim 4, wherein at the input station and the output station the buffer conveyor is provided with respective reverse members for turning the conveyor belt upside down, such that the return path extends at least partly in a lower plane which lies below the transport plane.

7. The buffer conveyor according to claim 6, wherein the reverse members are first reverse members and the buffer conveyor comprises respective second reverse members for turning the conveyor belt upside down, which second reverse members are functionally located between the return path bridge and the first reverse members, such that the return path partly extends in a return path bridge plane which lies at a different level than the lower plane.

8. The buffer conveyor according to claim 7, wherein the return path bridge plane and the transport plane form a common plane.

9. The buffer conveyor according to claim 8, wherein one of the transport path frame legs and one of the return path frame legs form a common first frame leg and wherein the other one of the transport path frame legs and the other one of the return path frame legs form a common second frame leg.

10. The buffer conveyor according to claim 7, wherein the return path bridge plane lies between the transport plane and the lower plane.

11. The buffer conveyor according to claim 1, wherein the transport path bridge and the return path bridge are fixed to each other.

12. A buffer conveyor, comprising:
an input station and an output station,
a drivable endless conveyor belt which successively follows a transport path from the input station to the output station and a return path from the output station to the input station, wherein the lengths of the transport path and the return path are inversely adjustable, and
a frame, wherein at the transport path the frame is provided with two parallel transport path frame legs for guiding the conveyor belt along the transport path frame legs and a U-shaped transport path bridge for guiding the conveyor belt between the transport path frame legs, which transport path bridge is at least partly located between the transport path frame legs and displaceable along the transport path frame legs, wherein within the transport path the conveyor belt successively follows from the input station one of the transport path frame legs, the transport path bridge and the other one of the transport path frame legs to the output station, wherein each of the transport path frame legs is provided with a transport path frame guide for supporting a lateral contact side of the conveyor belt in outward direction as seen from the other transport path frame leg, wherein the transport path frame guides are part of respective flexible strips which are in engagement with the transport path bridge such that the flexible strips are locally moved downwardly so as to move the transport path frame guide below the lateral contact side of the conveyor belt at an upstream and a downstream side of the transport path bridge.

13. The buffer conveyor according to claim 12, wherein each of the flexible strips is supported by the frame by spring elements which are locally loaded when the transport path bridge passes.

14. The buffer conveyor according to claim 12, wherein the conveyor belt is a slat belt including a plurality of interconnected slats, wherein each of the slats has an upper plate for supporting a product and two feet located below the upper plate and at a distance from each other in transverse direction of the conveyor belt, wherein the flexible strip extends between the feet.

15. The buffer conveyor according to claim 14, wherein the transport path frame guide is an outer transport path frame guide and each of the flexible strips also comprises an inner transport path frame guide which extends at an opposite side of the flexible strip, wherein the flexible strip fits between the two feet of each slat so as to keep the slats (19) on track along the transport path frame legs.

* * * * *